United States Patent [19]

Cook et al.

[11] Patent Number: 4,792,876

[45] Date of Patent: Dec. 20, 1988

[54] CAPSTAN CLEANER FOR VIDEO CASSETTE PLAYER/RECORDER

[75] Inventors: Randall W. Cook, Palo Alto; Bryan K. Clark, Sunnyvale, both of Calif.

[73] Assignee: Tandy Corporation, Fort Worth, Tex.

[21] Appl. No.: 58,960

[22] Filed: Jun. 8, 1987

[51] Int. Cl.$^4$ .................. G11B 5/10; G11B 5/127; G11B 5/41

[52] U.S. Cl. .................. 360/128; 15/210 R; 360/137

[58] Field of Search ............ 360/128, 137; 15/210 R, 15/DIG. 12, DIG. 13, 100

[56] References Cited

U.S. PATENT DOCUMENTS

| | | | |
|---|---|---|---|
| 4,387,411 | 6/1983 | Clausen et al. | 360/128 |
| 4,442,468 | 4/1984 | d'Alayer de Costemore d'Arc | 360/128 |
| 4,445,158 | 4/1984 | Clausen et al. | 360/137 |
| 4,454,550 | 6/1984 | Clausen et al. | 360/137 |
| 4,454,551 | 6/1984 | Clausen et al. | 360/137 |
| 4,498,113 | 2/1985 | Clausen et al. | 360/128 |
| 4,510,545 | 4/1985 | Bondreau | 360/128 |
| 4,580,185 | 4/1986 | Clausen et al. | 360/128 |
| 4,594,629 | 6/1986 | d'Alayer de Costemore d'Arc | 360/128 |
| 4,616,283 | 10/1986 | Clausen et al. | 360/128 |

OTHER PUBLICATIONS

Allsop, Installation Instructions VCR Cleaner Replacement Kit.

Primary Examiner—Stuart N. Hecker
Assistant Examiner—David J. Severin
Attorney, Agent, or Firm—Townsend and Townsend

[57] ABSTRACT

A cleaning apparatus for the capstan of a VHS-type video cassette player/recorder is disclosed which contains an absorbent pad in a cartridge which is both insertable and removable through one of the broad side walls of the cleaning cassette. A pin projecting from the cartridge and extending through an access hole in the opposite wall permits easy manual ejection of the cartridge when the absorbent pad needs cleaning or replacement.

8 Claims, 3 Drawing Sheets

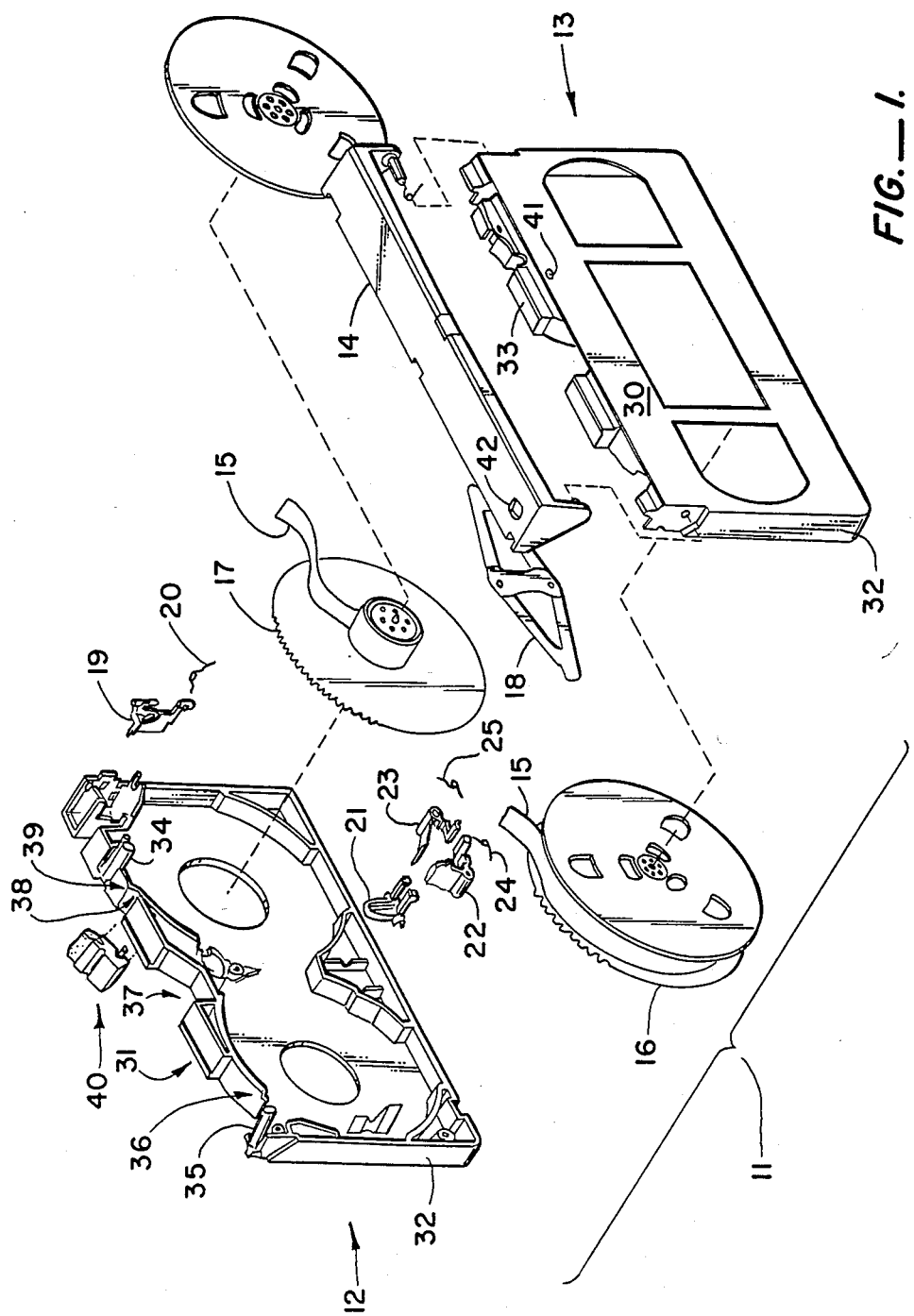
FIG.—1.

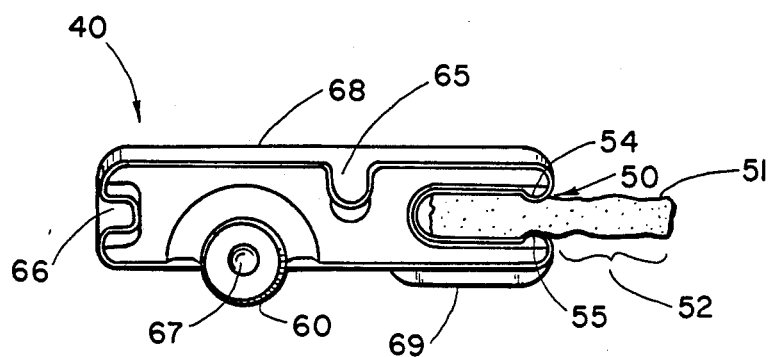
FIG._2A.
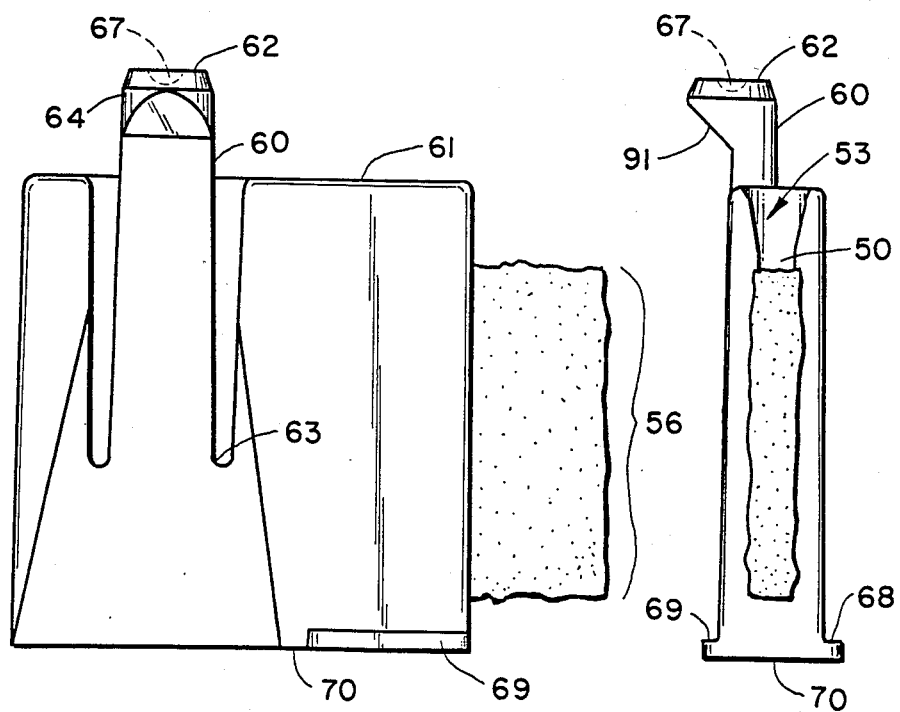
FIG._2B.   FIG._2C.

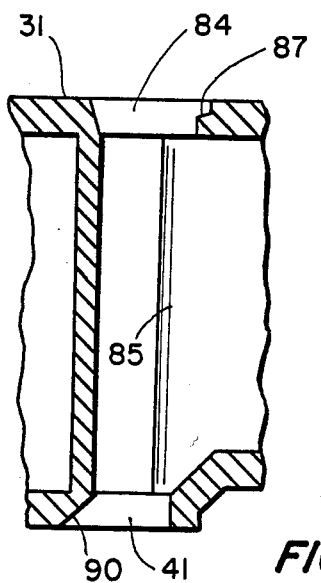
FIG._3B.
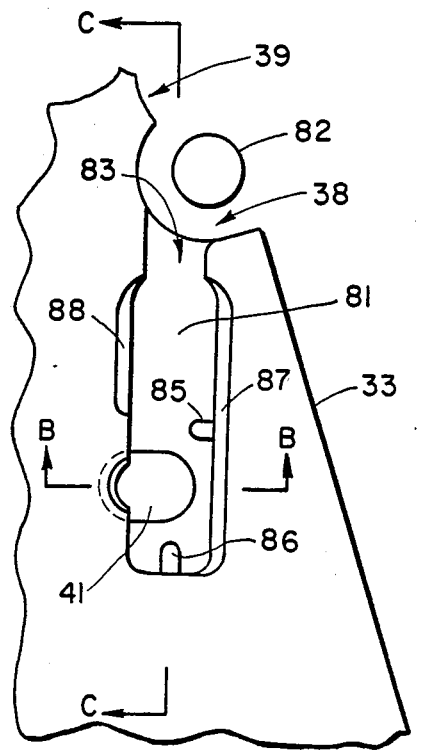
FIG._3A.
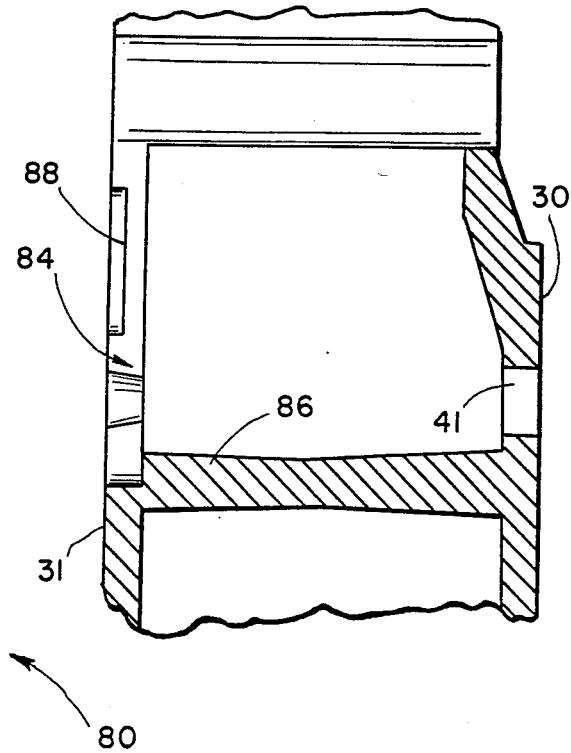
FIG._3C.

CAPSTAN CLEANER FOR VIDEO CASSETTE PLAYER/RECORDER

BACKGROUND OF THE INVENTION

This invention relates to cleaning apparatus for video cassette players, and particularly to players having a configuration in which the capstan extends into the cassette-receiving cavity. The focus of this invention is on means for cleaning the capstan shaft.

Most consumers are familiar with two types of video cassette formats—the "BETAMAX" and the "VHS." There are a number of differences in both the configuration and operation of the equipment for these two formats. One of these differecces is the location of the capstan. i.e. the rotating shaft in the player/recorder which engages the tape of a cassette during operation and regulates the tape speed. In the BETAMAX format, the capstan is positioned a few inches forward of the cassette-receiving cavity. During operation of the player/recorder, the video tape is drawn toward the capstan by a series of rollers located on a wheel which moves them from a position within the perimeter of the cassette (and inside the tape loop) to a position several inches forward of the cassette boundary. This draws the tape out from the cassette and extends it around an irregular path contacting all of the sensing and regulating components of the system including the capstan. In the VHS format, the capstan is located within the cassette-receiving cavity itself, and positioned to enter an indentation along the exposed-tape edge of the cassette housing when the cassette is inserted in the cavity. The capstan is thus behind and either in contact with or near the tape at all times, despite the fact that, as in the BETAMAX format, the tape is drawn out of the cassette by moving rollers during operation.

This difference in capstan location has a bearing on the operation of cleaning devices. As maufacturers frequently remind the consumer, the system components contacting the video tape should be cleaned periodically if the system is used with any frequency. To this end, cleaning devices in the shape of video cassettes are sold or rented, which are operated simply by insertion of the device into the machine and activation of the "PLAY" mode in the same manner as a video cassette. A claaning ribbon in such a device takes the place of the video tape, and is accordingly manipulated by the system in the same manner as the video tape to contact the system components. These devices are particularly appealing due to their ease of use and convenient shape and size.

Among the various components of the system, the capstan is critical in terms of cleaning since the tape is forced tightly against it by a pinch roller, and it is the one component that is externally driven to control the tape speed. The capstan in a BETAMAX system, or any system in which the capstan is removed from the cassette cavity, must be cleaned by the cleaning ribbon in the same manner as the other components (audio head, video head. erase head, etc.). In the VHS system, however, a capstan cleaning head may be positioned on the cleaner housing itself. This permits the use of a pad of absorbent material wetted with a cleaning solution pressing against the rotating capstan, rather than a cleaning ribbon, and hence a more rigorous cleaning.

Since the pad is stationary, it collects debris from the capstan shaft in a relatively narrow area on the pad surface. After only a small number of uses, this area becomes contaminated to the extent that effective cleaning is impossible. For this reason, cleaning devices have been designed with replaceable pads. Unfortunately, extra tools or a high degree of manual dexterity and a complicated sequence of steps are frequently required to effect removal and replacement of the pad.

SUMMARY OF THE INVENTION

A novel cleaning device for video cassette systems in which the capstan extends into the cassette-receiving cavity is provided herein. The absrrbent pad which wipes the rotating capstan is held in a cartridge designed for insertion in a cavity in the housing of the cleaning device. The cavity opening through which the cartridge is inserted is in one of the two side walls of the cleaning device. The "side walls" are defined herein as the broad opposing faces of the cassette whose planes are generally parallel and also perpendicular to the surface of the cleaning ribbon which substitutes for the video tape. An access hole extending into the cavity through the opposing side wall permits insertion of any handy narrow implement such as the tip of a pen to push the cartridge out of the cavity for purposes of replacement.

The cartridge is thus inserted and removed through a side wall. This is of particular advantage when the cleaning device also includes a cleaning ribbon manipulated by the system like a video tape for contact with the other components. As described herein, latral insertion and removal of the cartridge may be done independently of the cleaning ribbon, there being no need to draw the ribbon out of the device or disconnect it from either reel in order to provide access to the cartridge. In preferred embodiments, the cartridge contains a pin which projects backward so that when the cartridge is inserted in the cavity, the pin passes through the access hole. terminating flush with the outer surface of the housing wall. In further preferred embodiments, the pin terminates in a catch which engages the side wall adjacent to the access hole to secure the cartridge in place, the catch being releasable by manual pressure or sidewise shifting aided if necessary by an implement such as a pen tip.

Other advantages and preferred embodiments will be apparent from the following description.

BRIEF DESCRIPTION OF THE DRAWINGS

FIG. 1 is an exploded view of a cleaning device representing one embodiment of the present invention, including both the capstan cleaning cartridge and a cleaning ribbon for the heads of the player/recorder.

FIGS. 2a, 2b and 2c are enlarged illustrations of the cartridge shown in FIG. 1, in views from three orthogonal directions.

FIGS. 3a, 3b and 3c are enlarged views of the cartridge-receiving cavity in the housing shown in FIG. 1, viewed from three orthogonal directions, respectively. FIG. 3a is a view facing toward the outer surface of the side wall of the housing. showing the opening of the cavity. while FIGS. 3b and 3c are sectional views taken along lines B—B and C—C of FIG. 3a respectively.

DETAILED DESCRIPTION OF THE INVENTION AND PREFERRED EMBODIMENTS

Video cassette systems to which the present invention is applicable include all systems where a capstan falls at, within or near (i.e., in the region of) the perimeter of the cassette-receiving cavity in the player/recorder. The most prominent example is the well-known VHS system. In this regard, VHS systems are preferred. The invention is further applicable to any system which receives and operates a video cassette, particularly one of a shape and form which conforms to a standardized format. Again, the standard VHS format is preferred. The term "player/recorder" is intended to include those machines which play only, machines which record only, and machines which do both.

FIG. 1 depicts a cleaning device 11 in the form of a standard VHS video cassette, where the usual video tape is replaced by a cleaning ribbon. The cassette body or housing is formed in two parts 12, 13 which are secured together by screws. A ribbon access cover 14 is pivotally mounted to the housing, and the cleaning ribbon 15 is wound over a pair of reels 16, 17 held in place by a reel leaf spring 18. Among the various parts are a latch arm 19 and latch spring 20 for the ribbon access cover, a lock retractor arm 21, left and right reel locks 22, 23, and left and right reel lock springs 24, 25. When the parts are assembled, the device has two opposing side walls 30, 31 (the latter indicated by arrow but not visible in the drawing) and a perimeter wall 32 extending around the edges.

The cleaning ribbon 15 (which may include a leader tape) passes over the top portion 33 of the perimeter wall (i.e., "top" when taken in the direction shown in FIG. 1) where it is held in place by a pair of tape guides 34, 35. The straight length of the ribbon is covered by the ribbon access cover 14, until the latter is swung out of the way by the player/recorder to expose the ribbon.

The top portion 33 of the perimeter wall contains a series of indentations 36, 37, 38 and 39 for receiving various rollers and guideposts in the player/recorder (not shown). The rollers lift up the ribbon in the same manner as a video tape in the conventional cassette when the player/recorder is operating. Depending on the actual capstan location relative to the cassette, the portion of the peripheral wall surface which assumes a position closest to the capstan may be an indentation or a flat surface. In the embodiment shown in FIG. 1, the capstan falls inside the external rectangular outline of the cassette, and the adjacent peripheral wall portion is curved accordingly to form an indentation. Thus, two of the indentations 38, 39 are for the capstan and pinch roller, respectively.

Also shown in the drawing is the cartridge 40 which is insertable into the housing through one of the side walls 31. An access hole 41 in the other side wall 30 permits the operator to push the cartridge 40 back out when replacement is required. Also shown is a liquid addition hole 42 in the ribbon access cover 14 through which the operator may impregnate the cleaning ribbon underneath with a liquid cleaning solution.

The cartridge 40 is shown in enlarged detail in FIGS. 2a, 2b and 2c. The cartridge has a cavity 50 which is narrow and elongated in shape, open along one side (the side shown in FIG. 2c) and one end (the end shown in FIG. 2a) for receiving an assorbent pad 51, which is wide enough taat an extending portion 52 protrudes a substantial distance out sideways. The end opening 53 of the cavity is flared slightly to facilitate insertion of the absorbent pad. The dimensions of the cavity aside from the flared end opening are such as to provide a snug fit to securely retain the pad. Beads 54, 55 along the side opening edges serve to hold the pad in place.

The length of the extending portion 52 of the pad is sufficient to contact the capstan once the cartridge is inserted in the cleaning apparatus housing, and the width 56 of the pad should be greater than the width of the contact area on the capstan shaft which contacts a video tape in normal use. The pad may be made of any conventional material used in similar devices. Felt is a convenient example. A conventional cleaning liquid may also be used. Convenient examples are alcohols such as isopropyl alcohol.

A pin 60 forms part of the cartridge construction. The pin projects outward from the leading edge 61 of the cartridge, defined as the edge entering the housing cavity first when the cartridge is inserted. The pin extends through the access hole 4 (FIG. 1) when the cartridge is in place. Preferably, the end surface 62 of the pin lies flush with the outer surface of the side wall 30.

In this embodiment, it will be noted that the pin originates from a base 63 which is retracted into the cartridge body. This is to provide the pin with a resilient construction, particularly when the cartridge and pin are formed of a slightly deformable material such as plastic. The resilient nature of the pin imparts a gripping character to it as the cartridge is inserted into the cavity. It will be noted that the head 64 of the pin is expanded. The head thus functions as a catch to engage the side wall 30 of the housing when the cartridge is fully inserted. As will be explained more fully below, the access hole 41 is shaped to receive the expanded head 64 of the pin and hold it in place until the pin is bent backward. The access hole also allows the pin to be snapped into a relaxed position once the cartridge is fully inserted.

Guide slots 65, 66 are included in the cartridge body in the form of indentations along two side. These slots mate with ribs (shown in FIG. 3 and discussed below), and together with the pin insure both the proper orientation of the cartridge and a snug fit once the cartridge is inserted. A loose fit will also work adequately, but a snug fit is preferred. A "snug fit" is defined herein as the closest fit which can be assembled by hand for parts which do not move against each other during use.

In the view shown in FIG. 2c. the direction of motion of the pin 60 can be seen. During insertion of the cartridge into the cavity or its removal therefrom. the pin will be bent slightly to the right so that the enlarged head 64 will clear the access hole 41 (FIG. 1). Whenthe cartridge is fully in place, the pin will snap back to the left to engage the catch.

An indentation 67 in the end surface 62 of the pin is included to facilitate the manipulation of the pin when one desires to release the catch and remove the cartridge from the cassette. In the embodiment shown, this is a hemispherical indentation into which one may insert any common handy implement such as the tip of a pencil or ball-point pen. With the help of this implement, the pin can be bent back to the right in the view shown in FIG. 2c.

The cartridge also contains flanges 68, 69 along either side of its trailing edge 70 (being defined as the edge opposing the leading edge 61). The flanges limit the position of the cartridge upon insertion of the cartridge in the cassette.

Referring now to FIGS. 3a, 3b and 3c, the cassette 80 and the cartridge-receiving cavity 81 are shown in detail. The top portion 33 of the perimeter wall of the cassette is shown, as well as two of the indentations 38, 39, the former to receive the capstan shaft 82 and the latter to receive the pinch roller (not shown) which engages the capstan shaft during operation of the system. The cavity 81 communicates with the indentation 38 through a slot 83 through which the extended portion 52 of the absorbent pad 51 (FIG. 2a) passes so that it may contact the capstan shatt 82. The side wall opening 84 is viewed directly in FIG. 3a and in side cutaway views in FIGS. 3b and 3c. The access hole 41 is shown in the opposite side wall 30. Guiding ribs 85. 86 exten into the cavity 81 to mate with the guide slots 65. 66, respectively. The edges of the side wall opening 84 contain shoulders 87, 88 to meet with the flanges 68. 69 of the cartridge.

It will be noted that the access hole 41 is oblong in shape, to accommodate lateral movement of the pin head 64 protruding from the cartridge. As noted in FIG. 3b, the edge of the access hole on one side 90 is sloped. Referring back to FIG. 2c, it will be noted that the under surface 91 of the expanded pin head is likewise sloped. These two surfaces slope at the same angle and direction, and are in contact with each other when the pin and cartridge are in place, fully inserted. These contact surfaces together form the catch which holds the cartridge in place. The slope of these surfaces also facilitates release of the catch by responding to inward pressure along the axis of the pin, forcing the pin to move sideways as well.

By virtue of this simple construction, one can remove a contaminated absorbent pad by pushing in on the pin head 62, preferably by inserting a pen tip into the indentation 67, far enough so that the cartridge emerges from the other side of the cassette a sufficient distance to be gripped by one's fingers. The cartridge is then pulled out entirely, discarded and replaced with a new cartridge and pad, which are inserted through the opening 84 until the pin head 64 snaps into place.

The foregoing is offered primaril for purposes of illustration. It will be readily apparent to those skilled in the art that numerous modifications and variations of the features of construction and operation described above may be made without departing from the spirit and scope of the invention.

What is claimed is:

1. Cleaning apparatus for a player/recorder for video cassettes conforming in shape and size to a preselected standard, said player/recorder including a capstan positioned to be intthe region of the perimeter of such a video cassette when said video cassette is inserted into said player/recorder, said cleaning apparatus comprising:
    a housing conforming in shape and size to said preselected standard. said housing comprised of first and second side walls joined by a peripheral wall a surface portion of which assumes a position adjacent to said capstan when said housing is inserted into said player/recorder in place of such a video cassette;
    a cartridge with an absorbent pad fixed thereto, said pad adpated to clean the capstan of the player/recorder;
    a cavity in said housing adjacent to said surface portion and open through said first side wall to receive said cartridge in a snug fit, said cavity communicating with said surface portion through a slot to permit passage of said absorbent pad, and containing an access hole in said second side wall; and,
    two reels adapted to be inserted into spindles of the player/recorder.

2. Cleaning apparatus in accordance with claim 1 further comprising a pin projecting from said cartridge, said pin positioned to enter said access hole when said cartridge is inserted into said cavty.

3. Cleaning apparatus in accordance with claim 2 in which said pin is of a lenghh such that said pin terminates substantially flush with the outer surface of said second side wall when said cartridge is inserted into said cavity.

4. Cleaning apparatus in accordance with claim 2 in which said pin terminates in a catch which engages said second side wall when said cartridge is inserted into said cavity.

5. Cleaning apparatus in accordance with claim 4 in which said pin is of resilient construction to cause engagement of said catch to result from insertion of said cartridge into said cavity, and to permit release of said catch upon the application of manual pressure to said pin.

6. Cleaning apparatus in accordance with claim 4 in which said catch engages said second side wall through first and second contact surfaces on said catch and said second side wall, respectively, said first and second contact surfaces sloping with respect to the plane of said second side wall to effect sliding engagement of said catch with said second side wall.

7. Cleaning apparatus in accordance with claim 4 further comprising an indentation in said pin positioned to facilitate lateral movement of said pin to release said catch.

8. Cleaning apparatus for a player/recorder for video cassettes conforming in shape and size to a preselected standard, said player/recorder including a capstan positioned to be at the perimeter of such a video cassette when said video cassette is inserted into said player/recorder, said cleaning apparatus comprising:
    a housing conforming in shape and size to said preselected standard, said housing comprised of first and second side walls joined by a peripheral wall containing an indentation positioned to receive said capstan;
    a cleaning ribbon mounted to reels inside said housing in the same manner as a video tape in such a video cassette;
    a cartridge with an absorbent pad affixed thereto and a pin projecting therefrom, said pad adapted to clear the capstan of the player/recorder;
    a cavity in said housing adjacent to said indentation and open through said first side wall to receive said cartridge in a snug fit, said cavity communicating with said indentation through a slot to permit passage of said absorbent pad, and containing an access hole in said side wall;
    a pin of resilient construction projecting from said cartridge to enter said access hole when said cartridge is inserted into said cavity, said pin being of a length to terminate substantially flush with the outer surface of said second side wall when said cartridge is inserted into said cavity, and said pin terminating in a catch which engages said second side wall when said cartridge is inserted into said cavity.

* * * * *